United States Patent [19]
Araki et al.

[11] Patent Number: 5,939,484
[45] Date of Patent: Aug. 17, 1999

[54] RUBBER COMPOSITION AND PNEUMATIC TIRE USING SAID RUBBER COMPOSITION

[75] Inventors: Shunji Araki; Kazuhiro Yanagisawa, both of Tokyo, Japan

[73] Assignee: Bridgestone Corporation, Tokyo, Japan

[21] Appl. No.: 08/930,158

[22] PCT Filed: Aug. 26, 1997

[86] PCT No.: PCT/JP97/02959

§ 371 Date: Oct. 10, 1997

§ 102(e) Date: Oct. 10, 1997

[87] PCT Pub. No.: WO97/40095

PCT Pub. Date: Oct. 30, 1997

[30] Foreign Application Priority Data

| | | | |
|---|---|---|---|
| Aug. 26, 1996 | [JP] | Japan | 8-223588 |
| Aug. 26, 1996 | [JP] | Japan | 8-223589 |
| Aug. 26, 1996 | [JP] | Japan | 8-223591 |
| Aug. 26, 1996 | [JP] | Japan | 8-223592 |
| Dec. 16, 1996 | [JP] | Japan | 8-335976 |
| Dec. 26, 1996 | [JP] | Japan | 8-347332 |

[51] Int. Cl.$^6$ ........................... C08K 3/00
[52] U.S. Cl. ........................ 524/492; 524/493; 524/495; 524/496
[58] Field of Search ................. 524/492, 493, 524/495, 496

[56] References Cited

U.S. PATENT DOCUMENTS 4,820,751  4/1989  Takeshita et al. ............... 523/215

FOREIGN PATENT DOCUMENTS

| | | |
|---|---|---|
| 50-29741 | 9/1975 | Japan . |
| 51-20208 | 6/1976 | Japan . |
| 3-252431 | 11/1991 | Japan . |

*Primary Examiner*—Edward J. Cain
*Attorney, Agent, or Firm*—Sughrue, Mion, Zinn, Macpeak & Seas, PLLC

[57] ABSTRACT

The present invention provides a rubber composition comprising natural rubber and/or diene synthetic rubbers, silica in an amount of 10 to 85 parts by weight per 100 parts by weight of the rubber, a specific silane coupling agent, i.e., a bis(alkoxysilylalkyl) polysulfide having a polysulfide structure in which the distribution of sulfur is specified, in an amount of 1 to 20% by weight of the amount of silica, and a specific silica dispersion improver in an amount of 1 to 15% by weight of the amount of silica, and provides a pneumatic tire manufactured by using the rubber composition. The pneumatic tire has excellent low heat buildup property and abrasion resistance.

18 Claims, No Drawings

RUBBER COMPOSITION AND PNEUMATIC TIRE USING SAID RUBBER COMPOSITION

TECHNICAL FIELD

The present invention relates to a rubber composition comprising silica and a silane coupling agent and to a pneumatic tire prepared by using the rubber composition, and more particularly, to a rubber composition in which gelation of a polymer due to a silane coupling agent during mixing at high temperatures of 150° C. or more is suppressed such that the reaction of silica and the silane coupling agent proceeds efficiently without a deterioration in workability, and in which low heat buildup property and abrasion resistance are improved, and to a pneumatic tire prepared by using this rubber composition.

BACKGROUND ART

Heretofore, carbon black has been used as a reinforcing filler for rubber because carbon black provides higher reinforcement and more excellent abrasion resistance than other fillers. Recently, because of social requirements to save energy and to save resources, particularly to cut down fuel consumption of automobiles, a decrease in the heat buildup of rubber compositions is also required.

For decreasing the heat buildup of a rubber composition by using carbon black, use of a small amount of carbon black or use of a carbon black having a large particle size is considered. However, it is well known that, in both methods, decreasing heat buildup is in a contradictory relation with improving reinforcement and abrasion resistance of a rubber composition.

On the other hand, silica is known as a filler which provides decreased heat buildup of a rubber composition, and applications for many patents, for example, Japanese Patent Application Laid-Open No. Hei-3-252431, have heretofore been made.

However, silica has a tendency to form agglomerates of particles by hydrogen bonding of a silanol group which is a functional group on the surface. For improving the dispersion of silica particles into rubber, the mixing time must be increased. When dispersion of silica particles into rubber is insufficient, a problem arises in that processability in processes such as extrusion and the like deteriorates due to the increase in the Mooney viscosity.

Moreover, the surfaces of the silica particles are acidic. Therefore, there are problems in that, during vulcanization of the rubber composition, basic substances used as vulcanization accelerators are adsorbed such that vulcanization is not carried out sufficiently, and a sufficient modulus of elasticity is not obtained.

In order to solve these problems, various types of silane coupling agents have been developed. For example, use of a silane coupling agent as a reinforcing material is described in Japanese Patent Application Publication No.Sho-50-29741. However, the use of a silane coupling agent as a reinforcing material is still insufficient for improving fracture properties, workability, and processability of a rubber composition to high standards. Rubber compositions in which a combination of silica and a silane coupling agent is used as a reinforcing material are described in Japanese Patent Application Publication No. Sho-51-20208 and others. However, this method of using a combination of silica and a silane coupling agent as a reinforcing material has a drawback in that flow of the uncured rubber composition is markedly inferior and workability and processability deteriorate, although reinforcement of the rubber composition can be remarkably improved and the fracture properties are improved.

The drawbacks of the conventional technologies in which silane coupling agents are used arise due to the following mechanism. When the mixing temperature of rubber is low, the silanol group on the surface of the silica does not react sufficiently with the silane coupling agent, and as a result, the reinforcing effect is not obtained. Dispersion of the silica into the rubber is also inferior, and this causes deterioration of the low heat buildup property which is the strong point of a rubber composition containing silica. Moreover, some of the alcohol formed by the reaction of the silanol group on the surface of the silica and the silane coupling agent does not vaporize completely (during mixing) because of the low mixing temperature, and the residual alcohol in the rubber vaporizes during an extrusion process so as to form blisters.

On the other hand, when mixing is conducted at high temperatures of 150° C. or higher, the silanol group on the surface of the silica and the silane coupling agent sufficiently react with each other, and as a result, the reinforcing property is improved. Because dispersion of the silica into the rubber is also improved, a rubber composition having a good low heat buildup property is obtained, and the formation of blisters in an extrusion process is suppressed. However, in this temperature range, gelation of the polymer caused by the silane coupling agent takes place simultaneously, and the Mooney viscosity is markedly increased. Thus, processing in later stages becomes impossible in actuality.

Therefore, when a silane coupling agent is used in combination with silica, a multistep mixing must be conducted at a temperature lower than 150° C., and marked decrease in productivity is inevitable.

DISCLOSURE OF THE INVENTION

The present invention solves the above problems of the conventional art and provides a rubber composition and a pneumatic tire in which gelation of a polymer due to a silane coupling agent during mixing at high temperatures of 150° C. or more is suppressed such that the reaction of silica and the silane coupling agent proceeds efficiently without a deterioration in processability, and in which low heat buildup property and abrasion resistance are improved.

As the result of extensive studies conducted by the present inventors on rubber compositions comprising silica to solve the above problems, it was found that, when the distribution of bonded sulfur in each component contained in a silane coupling agent is specified, an increase in the Mooney viscosity of a rubber composition can be suppressed even when the rubber composition is mixed at high temperatures of 150° C. or higher, and a rubber composition having excellent low heat buildup property and processability can be obtained. It was also found that, when a specific dispersion improver is mixed with silica in a specific amount, the dispersion of the silica into a rubber is remarkably improved, the Mooney viscosity of the rubber composition is decreased, and the low heat buildup property and abrasion resistance are improved. The present invention was accomplished on the basis of this knowledge.

The present invention is as follows.

1. A rubber composition which comprises a rubber component comprising at least one member selected from the group consisting of natural rubber and diene synthetic rubbers; silica in an amount of 10 to 85 parts by weight and preferably 20 to 65 parts by weight per 100 parts by weight of the rubber component; in an amount of 1 to 20% by weight and preferably 3 to 15% by weight of the amount of silica, a silane coupling agent represented by following general formula (I):

$$(C_nH_{2n+1}O)_3Si\text{—}(CH_2)_m\text{—}S_y\text{—}(CH_2)_m\text{—}Si(C_nH_{2n+1}O)_3 \quad (I)$$

wherein n represents an integer of 1 to 3, m represents an integer of 1 to 9, y represents a positive number of 1 or more which has a distribution, and the distribution of —$S_y$— satisfies the relation:

$$(S_1+S_2+S_3+S_4)/(S_5+S_6+S_7+S_8+S_9) \geq 0.85;$$

and, in an amount of 1 to 15% by weight and preferably 2 to 15% by weight of the amount of silica, at least one silica dispersion improver selected from the group consisting of:
(1) hexamethyldisilazane,
(2) hydrogen silicone oils represented by general formula (II):

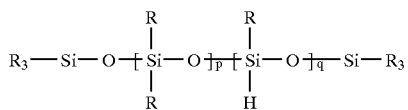

(3) silicone oils modified with an alkoxy group or an amino group which are represented by general formula (III):

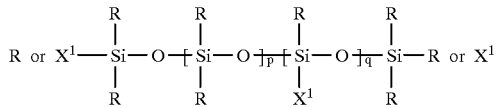

wherein, in general formulae (II) and (III), R represents an alkyl group having 1 to 3 carbon atoms or a phenyl group each of p and q represents a number of units, $1 \leq p+q \leq 200$, $q/(p+q) \geq 0.15$, $X^1$ represents an alkoxy group having 1 to 3 carbon atoms or an amino group represented by —$R^1NR^2R^3$ or —$R^1NHR^4NR^2R^3$, wherein $R^1$ and $R^4$ each represents —$(CH_2)_n$—, n represents 1, 2, or 3, and $R^2$ and $R^3$ each independently represents a hydrogen atom, an alkyl group having 1 to 36 carbon atoms, or a phenyl group,
(4) carbonyl compounds containing nitrogen which are represented by general formulae (IV):

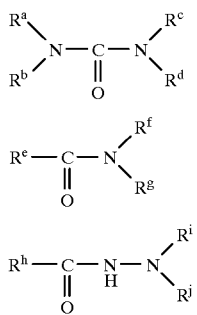

wherein $R^a$ to $R^j$ each represents a hydrogen atom or a linear or branched saturated or unsaturated aliphatic, aromatic, or alicyclic hydrocarbon having 1 to 20 carbon atoms, and (5) amine compounds represented by general formula (V):

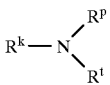

wherein $R^p$ and $R^t$ each independently represents an alkyl or alkenyl group having 1 to 36 carbon atoms, a benzyl group, a cyclohexyl group, or one of these groups substituted with a hydroxyl group, and $R^k$ represents an alkyl, alkenyl, or alkoxy group having 1 to 36 carbon atoms or one of these groups substituted with a hydroxyl group, a benzyl group, a benzyl group substituted with an alkyl or alkenyl group having 4 to 36 carbon atoms, or a group represented by following general formulae (VI):

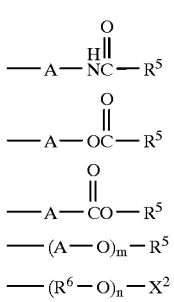

wherein $R^5$ represents an alkyl or alkenyl group having 1 to 36 carbon atoms, $R^6$ represents an ethylene group or a propylene group, $X^2$ represents a hydrogen atom, an alkyl, alkenyl, alkyloyl, or alkenyloyl group having 1 to 18 carbon atoms, A represents an alkylene or hydroxyalkylene group having 2 to 6 carbon atoms, m represents an integer of 1 to 10, A may be the same or may differ from each other when m represents 2 or a number greater than 2, and n represents an integer of 1 to 10;

2. A rubber composition as described in above 1, wherein the distribution of —$S_y$— satisfies the relation:

$$(S_1+S_2+S_3)/(\text{component(s) S having 4 or more sulfurs}) \geq 0.45$$

and the content of component $S_3$ is 20% or more;

3. A rubber composition as described in above 1, wherein the distribution of —$S_y$— satisfies the relation:

$$(S_1+S_2+S_3)/(\text{component(s) S having 4 or more sulfurs}) \geq 0.55$$

and the content of component $S_3$ is 30% or more;

4. A rubber composition as described in above 1, 2, or 3 which additionally comprises 80 parts by weight or less and preferably 20 to 60 parts by weight of carbon black as a reinforcing filler per 100 parts by weight of the rubber component;

5. A rubber composition as described in above 1, 2, or 3, wherein anhydrous sodium sulfide ($Na_2S$) and sulfur (S) are reacted with each other in a mol ratio in a range of 1:1 to 1:2.5 in an atmosphere of an inert gas in a polar solvent to obtain sodium polysulfide, the obtained sodium polysulfide is reacted in an atmosphere of an inert gas with a halogenoalkoxysilane represented by general formula (VII):

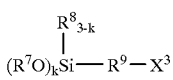

$$(R^7O)_k \underset{\underset{R^8{}_{3-k}}{|}}{Si} - R^9 - X^3 \qquad (VII)$$

wherein $R^7$ and $R^8$ each represents an alkyl group having 1 to 3 carbon atoms, $R^9$ represents a divalent hydrocarbon group having 1 to 9 carbon atoms, $X^3$ represents a halogen atom, and k represents an integer of 1 to 3, and the obtained compound is used as the silane coupling agent; and 6. A pneumatic tire which is manufactured by using the rubber composition described in above 1, 2, 3, 4, or 5 for its tread rubber.

BEST EMBODIMENTS FOR IMPLEMENTING THE INVENTION

Embodiments for implementing the present invention are described in detail hereinafter.

As the rubber component in the present invention, natural rubber (NR) and synthetic rubbers can be used singly or a blend of two or more rubbers can be used. Examples of the synthetic rubber include synthetic polyisoprene rubber, polybutadiene rubber (BR), styrene-butadiene rubber (SBR), butyl rubber, and halogenated butyl rubber.

The silica used in the present invention is a synthetic silica produced by a precipitation process. Specific examples of the silica include NIPSIL AQ manufactured by NIPPON SILICA INDUSTRIAL Co., Ltd.; ULTRASIL VN3 and BV3370GR manufactured by DEGUSSA AG., a German company; RP1165MP, ZEOSIL 165GR, and ZEOSIL 175MP manufactured by RHONE-POULENC Co.; and HISIL233, HISIL210, and HISIL255 manufactured by PPG Co. (all trade names) However, the silica used in the present invention is not limited to these examples.

The amount of silica used is 10 to 85 parts by weight, preferably 20 to 65 parts by weight, per 100 parts by weight of the above rubber component. When the amount of silica used is less than 10 parts by weight, the reinforcing property deteriorates. On the other hand, when the amount of silica used exceeds 85 parts by weight, workability, such as workability in warming up and extrusion, deteriorates. Therefore, such amounts are not preferable. From the standpoint of the low heat buildup property and workability, the amount of silica used is preferably 20 to 65 parts by weight.

The silane coupling agent used in the present invention is a silane coupling agent represented by following general formula (I):

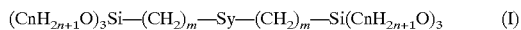

$$(C_nH_{2n+1}O)_3Si-(CH_2)_m-S_y-(CH_2)_m-Si(C_nH_{2n+1}O)_3 \qquad (I)$$

wherein n represents an integer of 1 to 3, m represents an integer of 1 to 9, and y represents a positive number of 1 or more which has a distribution. The distribution of —Sy— must satisfy the relation:

$$(S_1+S_2+S_3+S_4)/(S_5+S_6+S_7+S_8+S_9) \geq 0.85,$$

and preferably the relation:

$$(S_1+S_2+S_3+S_4)/(S_5+S_6+S_7+S_8+S_9) \geq 1.0.$$

When this distribution ratio is less than 0.85, the effect of suppressing gelation of a polymer during mixing at high temperatures of 150° C. or higher is not obtained, and the Mooney viscosity is markedly increased to cause inferior processability. It is preferable that the distribution of —Sy— satisfies the relation $(S_1+S_2+S_3)$/(component(s) S having 4 or more sulfurs)$\geq 0.45$, and the content of the component $S_3$ is 20% or more. It is more preferable that the distribution of —Sy— satisfies the relation $(S_1+S_2+S_3)$/(component(s) S having 4 or more sulfurs)$\geq 0.55$, and the content of the component $S_3$ is 30% or more. When the above ratio is less than 0.45, the effect of suppressing gelation of a polymer during mixing at high temperatures of 150° C. or higher is not sufficiently obtained, and the Mooney viscosity is markedly increased to cause inferior processability. When the content of the component $S_3$ is 20% or more, the reinforcing property is further enhanced and the improvement in abrasion resistance is not adversely affected because the contents of components $S_1$ and $S_2$ which do not contribute to the coupling ability are relatively small.

The amount of the silane coupling agent used is 1 to 20% by weight, preferably 3 to 15% by weight, based on the amount of silica. When the amount of the silane coupling agent used is less than 1% by weight, the coupling effect is small. On the other hand, when the amount of the silane coupling agent exceeds 20% by weight, gelation of the polymer takes place. Therefore, such amounts are not preferable.

The silica dispersion improver used in the present invention is preferably at least one compound selected from the group consisting of (1) hexamethyldisilazane, (2) hydrogen silicone oils represented by above general formula (II), (3) silicone oils modified with an alkoxy group or an amino group which are represented by above general formula (III), (4) carbonyl compounds containing nitrogen which are represented by above general formulae (IV), and (5) amine compounds represented by above general formulae (V).

In the case of the hydrogen silicone oil or the silicone oil modified with an alkoxy group or an amino group which are represented by the above formulae, when the degree of polymerization of the siloxane bond (p+q) is greater than 200, the effects of decreasing the compound Mooney viscosity and of improving the heat buildup property are decreased. Therefore, the degree of polymerization of the siloxane bond (p+q) must be 200 or less and is preferably 100 or less. When the value of q/(p+q) is smaller than 0.15, neither an improvement in the dispersion of the silica into the rubber nor efficient vulcanization are achieved. Therefore, the value of q/(p+q) must be 0.15 or more and is preferably 0.3 or more.

In the silicone oil modified with an amino group, the amino group may be any of a primary amino group, a secondary amino group, and a tertiary amino group. When carbon black is used, the amino group is preferably a secondary amino group or a tertiary amino group, more preferably a tertiary amino group. When carbon black is used together with the silicone oil modified with an amino group, the hydrogen atom bonded to the nitrogen atom accelerates the vulcanization reaction so as to decrease the scorch time, and is not preferable from the standpoint of processability.

The carbonyl compound containing nitrogen which is used in the present invention may be used singly or as a combination of two or more types. Specific examples of the carbonyl compound containing nitrogen include urea, 1,1-dimethylurea, 1,3-dimethylurea, tetramethylurea, 1,3-diphenylurea, acetamide, and stearic acid hydrazide. Among these compounds, urea is preferable because urea exhibits the greatest effect.

Specific examples of the group represented by $R^k$ in general formula (V) representing the amine compound used in the present invention include methyl group, ethyl group, propyl group, lauryl group, stearyl group, lauroylaminoethylene group, stearoyloxyethylene group, acryloyloxypropylene group, methacroyloxypropylene group, 2-hydroxymethyl group, 2-hydroxydodecyl group, benzyl group, and cyclohexyl group.

Specific examples of the groups represented by $R^p$ and $R^t$ include methyl group, ethyl group, lauryl group, stearyl group, vinyl group, allyl group, 3-allyloxy-2-hydroxypropyl group, benzyl group, and hydroxyethyl group.

Specific examples of the group represented by $R^5$ in general formulae (VI) include methyl group, ethyl group, lauryl group, stearyl group, vinyl group, and allyl group.

Specific examples of the atom or the group represented by $X^2$ include hydrogen atom, ethyl group, lauryl group, stearyl group, vinyl group, allyl group, lauroyl group, stearoyl group, acryloyl group, and methacryloyl group.

Specific examples of the amine compound used in the present invention include N,N,N-trioctylamine, N,N-dimethyl-N-decylamine, N,N-dimethyl-N-myristylamine, N,N-dilauryl-N-methylamine, N,N-dimethyl-N-octadecenylamine, N,N-dimethyl-N-hexadecenylamine, N,N-dimethyl-N-methacryloxypropylamine, N-methyl-N, N-divinylamine, N,N,N-trilaurylamine, N,N,N-tristearylamine, N,N-dimethyl-N-laurylamine, N,N-dimethyl-N-stearylamine, N-methyl-N,N-dilaurylamine, N-methyl-N,N-distearylamine, N,N-dibenzyl-N-stearylamine, N-benzyl-N,N-dilaurylamine, N,N-diallyl-N-stearylamine, N,N-diallyl-N-laurylamine, N,N-dimethyl-N-lauroyloxyethylamine, N,N-dimethyl-N-stearoyloxyethylamine, N,N-dimethyl-N'-lauroylpropylamine, N,N-dihydroxyethyl-N-stearylamine, N,N-dihydroxyethyl-N-laurylamine, N,N-dihydroxyethyl-N-(2-hydroxydodecyl)amine, N,N-polyoxyethylene-N-stearylamine, N,N-di(2-hydroxy-3-allyloxypropyl)-N-hexadecylamine, N,N-di(2-hydroxy-3-allyloxypropyl)-N-octadecylamine, N,N-di(2-hydroxy-3 -acryloxycarbonyl) propyl-N-hexadecylamine, N,N-di(2-hydroxy-3-acryloxycarbonyl)propyl-N-octadecylamine, N,N-di(5-hydroxy-3,7-dioxy-9-decyl-1-yl)-N-octadecylamine, and esters of these amines with acrylic acid, methacrylic acid, and fatty acids.

The preferable examples of the amine compound include dimethylalkylamines represented by general formula (V) in which $R^k$ and $R^p$ both represent methyl group $R^t$ represents an alkyl group having 12 to 36 carbon atoms. Dimethylstearylamine is more preferable from the standpoint of the flash point, the low heat buildup property, and improvement in the dispersion.

The molecular weight of the amine compound used in the present invention is preferably 180 or more. When the molecular weight of the amine compound is lower than 180, the flash point is decreased which causes the possibility of ignition during processing, and such a molecular weight is not preferable.

The amount of the silica dispersion improver used is 1 to 15% by weight, preferably 2 to 15% by weight, of the amount of silica. When the amount used is less than 1% by weight, the desired improvements in low heat buildup property and abrasion resistance and decrease in the Mooney viscosity of the rubber composition cannot be expected. When the amount exceeds 15% by weight, problems arise in that, for example, the effect of improving dispersion and the low heat buildup effect are saturated, the scorch time is decreased, and premature vulcanization (scorching) is caused. Further, abrasion resistance is decreased due to the increased effect of the dispersion improver as a plasticizer. Therefore, such amounts are not preferable.

As the carbon black used as a reinforcing filler in the present invention, a carbon black of the grade SAF, ISAF, or HAF is preferably used. However, the type of carbon black is not particularly limited.

The amount of carbon black used is preferably 80 parts by weight or less per 100 parts by weight of the rubber component. When the amount of carbon black exceeds 80 parts by weight, the low heat buildup property deteriorates to a great extent. From the standpoint of the reinforcing property and the low heat buildup property, the amount is more preferably 25 to 60 parts by weight.

Into the rubber composition of the present invention, compounding ingredients generally used in the rubber industry such as softeners, antioxidants, vulcanizing agents, vulcanization accelerators, and vulcanization accelerator activators, can suitably be mixed as needed in addition to the rubber component, silica, the silane coupling agent, and the carbon black which are described above.

To effectively exhibit the characteristics of the rubber composition of the present invention, the mixing temperature is preferably 150° C. or higher and 180° C. or lower. When the mixing temperature is lower than 150° C., the silane coupling agent does not react sufficiently, and blisters are formed during extrusion. When the temperature exceeds 180° C., gelation of the polymer takes place such that the Mooney viscosity increases. Therefore, such temperatures are not preferable from the standpoint of processing.

The mechanism for preventing gelation of a polymer and improving the low heat buildup property at a mixing temperature of 150° C. or higher is described hereinafter on the basis of the results of studies and considerations of the results.

A silane coupling agent generally used in the tire industry (trade name: Si69, manufactured by DEGUSSA AG., a German company) was heated in an oven at 150° C. for 2 hours and cooled. Thereafter, the treated silane coupling agent was analyzed by high performance liquid chromatography. It was confirmed from the results of the analysis that the components having sulfur chains of —$S_6$— or longer in the molecule were decreased as compared to the original material, and the free sulfur and components having sulfur chains of —$S_4$— or shorter in the molecule were increased as compared to the original material. In other words, it was thought that the components having sulfur chains of —$S_6$— or longer in the molecule were decomposed by the heating at a high temperature. It can be surmised that gelation of a polymer takes place during mixing at a high temperature because radicals are formed during the decomposition of the silane coupling agent or because products formed by the decomposition work as a source of sulfur. Therefore, it was believed that gelation of a polymer is suppressed during mixing at temperatures of 150° C. or higher when the silane coupling agent originally contains smaller amounts of the components having long sulfur chains in the molecule. As the result of intensive studies in accordance with the above idea, it was found that, when the proportion of the components having short sulfur chains in the molecule among the components having sulfur chains of various lengths in the molecule was increased to a specific value or more, gelation of the polymer was actually suppressed. Moreover, dispersion of silica into rubber was improved because the reaction of the silanol group on the surface of the silica and the silane coupling agent took place sufficiently due to mixing at a high temperature, and the low heat buildup property could be obtained.

When a hydrogen silicone oil is used as the silica dispersion improver, the hydrogen atom bonded to the silicon atom is active, and a dehydrogenation reaction takes place between the hydrogen atom and silanol group on the surface of the silica. When a silicone oil modified with an alkoxy group is used, a condensation reaction with dehydration takes place between the silanol group on the surface of the silica and the silanol group formed by hydrolysis of the alkoxy group. When a silicone oil modified with an amino group, a carbonyl compound containing nitrogen, or an amine compound is used, the nitrogen atom in the molecule has a great ability to form a hydrogen bond with the silanol group on the surface of the silica. The silanol group on the surface of the silica is masked by these reactions. It is considered that these reactions or effects prevent agglomeration of the silica particles. Moreover, when a hydrogen silicone oil or a silicone oil modified with an alkoxy group is used, the alkyl group bonded in these oils has a large affinity with rubber. When a silicon oil modified with an amino group, a carbonyl compound containing nitrogen, or an amine compound is used, the reaction of these compounds with the silanol group on the surface of the silica is chemisorption. Therefore, it is considered that the dispersion of the silica into rubber can be improved even in a low temperature range during the initial period of rubber mixing, that the Mooney viscosity of the rubber composition is thus decreased, and that the low heat buildup property and abrasion resistance are improved.

EXAMPLES

The present invention is described more specifically with reference to the following examples.

The basic formulation used in all of the Examples and Comparative Examples is given in Table 5.

The formulations containing various types of silicone oils modified with an alkoxy group are given in Tables 6 and 7.

The formulations containing various types of silicone oils modified with an amino group are given in Tables 8 and 9.

The formulations containing various types of hydrogen silicone oils are given in Tables 10 and 11.

The formulations containing various types of carbonyl compounds containing nitrogen are given in Tables 12 and 13.

The formulations containing various types of amine compounds are given in Tables 14 and 15.

The formulations containing hexamethyldisilazane are given in Tables 16 and 17. various rubber compositions were prepared in accordance with the formulations given in the above tables.

The results of the evaluation of the prepared rubber compositions are given in the corresponding tables.

The silane coupling agents used in the above formulations are expressed by the following formula:

$(C_2H_5O)_3Si(CH_2)_3$—Sy—$(CH_2)_3Si(C_2H_5O)_3$, and —Sy— in this formula has the distribution shown in Table 1.

(Analysis of the distribution of —Sy—)

The distributions of various sulfur chain components (—Sy—) in the silane coupling agents used in the Examples and the Comparative Examples are shown in Table 1. The distribution was obtained by calculation from peak areas (%) obtained by high performance liquid chromatography (HPLC). The analysis by HPLC is described in detail hereinafter.

(Conditions of analysis by HPLC)

HPLC: manufactured by TOSOH CORPORATION, HLC-8020

UV detector: manufactured by TOSOH CORPORATION, UV-8010 (254 nm)

Recorder: manufactured by TOSOH CORPORATION, SUPER SYSTEM CONTROLLER SC-8010

Column: manufactured by TOSOH CORPORATION, TSK Gel ODS-80$T_M$ CTR (inner diameter: 4.6 mm, length: 10 cm)

Temperature at the time of measurement: 25° C.

Concentration of sample: 6 mg/10 cc (6 mg per 10 cc of acetonitrile solution)

Amount of sample injected: 20 $\mu$l

Condition of elution: flow rate of 1 cc/min

A sample was eluted for 2 minutes with a mixed solution of acetonitrile and water having a fixed composition of 1:1, and then with a mixed solution having a varying composition with such a gradient that the solution contained 100% of acetonitrile after 18 minutes.

When the silane coupling agent of sample A (Si69, manufactured by DEGUSSA AG., a German company) shown in Table 1 was analyzed under the above conditions, peaks of free sulfur, —$S_2$—, —$S_3$—, —$S_4$—, —$S_5$—, —$S_6$—, —$S_7$—, -$S_8$—, and —$S_9$— appeared at positions around peak times of 17.5, 19.5, 20.6, 21.7, 22.8, 24.0, 25.4, 27.1, and 29.0 minutes, respectively. From the measurement of each peak area, the values of $(S_1+S_2+S_3+S_4)$ and $(S_5+S_6+S_7+S_8+S_9)$ were obtained. The value of $(S_1+S_2+S_3+S_4)/(S_5+S_6+S_7+S_8+S_9)$ was calculated from these values and found to be 0.73.

The values of $(S_1+S_2+S_3)$ and $(S_4+S_5+S_6+S_7+S_8+S_9)$ were also obtained. The value of $(S_1+S_2+S_3)/(S_4+S_5+S_6+S_7+S_8+S_9)$ was calculated from these values and found to be 0.225. The peak area of component $S_3$ was 15.9% of the total. These values were obtained for samples B to G as shown in Table 1.

TABLE 1

| | $S_1 + S_2 + S_3 + S_4$ | $S_5 + S_6 + S_7 + S_8 + S_9$ | $(S_1 + S_2 + S_3 + S_4)/(S_5 + S_6 + S_7 + S_8 + S_9)$ | $S_1 + S_2 + S_3$ | component(s) S having 4 or more sulfurs | $(S_1 + S_2 + S_3)/$ (component(s) S having 4 or more sulfurs) | $S_3$ |
|---|---|---|---|---|---|---|---|
| sample A[*1] | 42.15 | 57.85 | 0.73 | 18.4 | 81.6 | 0.225 | 15.9 |
| sample B[*2] | 48.57 | 51.43 | 0.94 | 22.9 | 77.1 | 0.298 | 19.4 |
| sample C[*2] | 85.17 | 14.83 | 5.74 | 61.8 | 38.2 | 1.616 | 44.1 |
| sample D[*2] | 100 | 0 | ∞ | 100 | 0 | ∞ | 3.2 |
| sample E[*2] | 66.87 | 33.13 | 2.02 | 37.5 | 62.5 | 0.600 | 30.3 |
| sample F[*2] | 91.39 | 8.61 | 10.62 | 83.2 | 16.8 | 4.959 | 37.8 |

[*1]Si69, manufactured by DEGUSSA AG., a German company
[*2]Prepared samples B through F (Preparation of various types of silane coupling agents)

Preparation of sample A

Si69 manufactured by DEGUSSA AG., a German company, was used.

Preparation of samples B, C, E, and F

Samples B, C, E, and F were synthesized in accordance with the method described in Japanese Patent Application Laid-Open No. Hei-7-228588 from anhydrous sodium sulfide and sulfur in the following mol ratios:

sample B 1:2.5 sample C 1:1.5 sample E 1:2 sample F 1:1

Preparation of sample D

Sample D was synthesized in accordance with the method described in European Patent 0 732 362 A1 by oxidation of γ-mercaptopropyltriethoxysilane using manganese dioxide as a catalyst.

(Types of dispersion improvers)

The dispersion improvers used in the formulations of rubber compositions were as follows:

The silicone oils modified with an alkoxy group are shown in Table 2.

The silicon oils modified with an amino group are shown in Table 3.

The hydrogen silicone oils are shown in Table 4.

The carbonyl compounds containing nitrogen are shown in Tables 12 and 13.

The amine compounds are shown in Tables 14 and 15.

Hexamethyldisilazane is shown in Tables 16 and 17.

TABLE 2

$$Me_3Si-O-\left[\begin{array}{c}Me\\|\\Si-O\\|\\Me\end{array}\right]_p\left[\begin{array}{c}Me\\|\\Si-O\\|\\X\end{array}\right]_q-SiMe_3$$

| | p | q | p + q | q/(p + q) | alkoxy group |
|---|---|---|---|---|---|
| sample a | 12 | 14 | 26 | 0.54 | —$OC_2H_5$ |
| sample b | 152 | 53 | 205 | 0.26 | —$OC_2H_5$ |
| sample c | 48 | 7 | 55 | 0.13 | —$OC_2H_5$ |
| sample d | 24 | 5 | 29 | 0.17 | —$OC_2H_5$ |
| sample e | 15 | 15 | 30 | 0.50 | —$OCH_3$ |
| sample f | 12 | 18 | 30 | 0.60 | —$OC_3H_7$ |

TABLE 3

$$Me_3Si-O-\left[\begin{array}{c}Me\\|\\Si-O\\|\\Me\end{array}\right]_p\left[\begin{array}{c}Me\\|\\Si-O\\|\\X\end{array}\right]_q-SiMe_3$$

| | p | q | p + q | q/(p + q) | amino group |
|---|---|---|---|---|---|
| sample g | 13 | 13 | 26 | 0.50 | —$(CH_2)_3NH_2$ |
| sample h | 139 | 93 | 232 | 0.40 | —$(CH_2)_3NH_2$ |
| sample i | 43 | 6 | 49 | 0.12 | —$(CH_2)_3NH_2$ |
| sample j | 27 | 6 | 33 | 0.18 | —$(CH_2)_3NH_2$ |
| sample k | 14 | 12 | 26 | 0.46 | —$(CH_2)_3NH(CH_2)_2NH_2$ |
| sample m | 12 | 14 | 26 | 0.54 | —$(CH_2)_3N(CH_3)_2$ |

TABLE 3-continued $$Me_3Si-O-\left[\begin{array}{c}Me\\|\\Si-O\\|\\Me\end{array}\right]_p\left[\begin{array}{c}Me\\|\\Si-O\\|\\X\end{array}\right]_q-SiMe_3$$

| | p | q | p + q | q/(p + q) | amino group |
|---|---|---|---|---|---|
| sample n | 10 | 12 | 22 | 0.55 | —$(CH_2)_3N\begin{array}{c}CH_3\\ \\C_{18}H_{37}\end{array}$ |

TABLE 4

$$Me_3Si-O-\left[\begin{array}{c}Me\\|\\Si-O\\|\\Me\end{array}\right]_p\left[\begin{array}{c}Me\\|\\Si-O\\|\\H\end{array}\right]_q-SiMe_3$$

| | p | q | p + q | q/(p + q) |
|---|---|---|---|---|
| sample s | 38 | 8 | 46 | 0.18 |
| sample t | 32 | 26 | 58 | 0.45 |
| sample u | 32 | 61 | 93 | 0.66 |
| sample v | 124 | 82 | 206 | 0.40 |
| sample w | 43 | 6 | 49 | 0.12 |

(Evaluation)

The obtained rubber compositions were evaluated with respect to abrasion resistance, Mooney viscosity, the hysteresis loss property (heat buildup), and formation of blisters in accordance with the following methods of evaluation. Then, 185/60R14 size tires were manufactured by using the obtained rubber compositions as the treads, and the rolling resistance of the prepared tires was evaluated.

(1) Abrasion resistance

The abrasion resistance was measured in accordance with the method of BS (British Standard) 903 (part A), Method D using a Lambourn abrasion tester at a ground-contacting pressure on the tire tread of 5 kg/cm$^2$ and a slip ratio of 40%. The index for abrasion resistance which expresses abrasion resistance was calculated in accordance with the following equation:

index for abrasion resistance={(abrasion loss of control piece)/(abrasion loss of sample piece)}×100

The larger the index, the better the abrasion resistance.

(2) Mooney viscosity

Mooney viscosity was measured in accordance with the method of Japanese Industrial Standard K6300 for a time of 4 minutes at a temperature of 130° C. after preheating for 1 minute. The obtained result is expressed as an index with reference to a control. The smaller the index, the lower the Mooney viscosity and the better the processability.

(3) Measurement of the hysteresis loss property (heat buildup)

The internal loss (tan δ) was measured by using a viscoelastic spectrometer manufactured by IWAMOTO SEISAKUSHO Co., Ltd. under the conditions of a dynamic tensile strain of 1%, a frequency of 50 Hz, and a temperature of 60° C. A slab sheet having a thickness of about 2 mm and a width of 5 mm was used as the test piece. The distance between clamps was 2 cm, and the initial load was 160 g. The obtained value of tan δ is expressed as an index with reference to a control. The smaller the index, the smaller the hysteresis loss and the lower the heat buildup.

(4) Measurement of rolling resistance

The tire prepared above was attached to a rim 6JJ, inflated to an inner pressure of 2.0 kg/cm² and, under a load of 440 kg, was made to contact a drum having an outer diameter of 1.7 m, and the drum was rotated. The speed was increased to 120 km/hour, and then the drum was allowed to rotate inertially. The moment of inertia was measured when the speed reached 80 km/hour. Rolling resistance was evaluated from the obtained moment of inertia in accordance with the following equation:

index=[(moment of inertia of control tire)/(moment of inertia of sample tire)]×100

The calculated value is expressed as an index with the value of control being set to 100. The larger the index, the better the rolling resistance.

In the above evaluation, the rubber composition of Comparative Example 1 was used as the control for Examples 1 to 12 and Comparative Examples 2 to 7, the rubber composition of Comparative Example 8 was used as the control for Example 13 and Comparative Examples 9 and 10, and the rubber composition of Comparative Example 11 was used as the control for Examples 14 and 15.

The rubber composition of Comparative Example 12 was used as the control for Examples 16 to 28 and Comparative Examples 13 to 18, the rubber composition of Comparative Example 19 was used as the control for Example 29 and Comparative Examples 20 and 21, and the rubber composition of Comparative Example 22 was used as the control for Examples 30 and 31.

The rubber composition of Comparative Example 23 was used as the control for Examples 32 to 42 and Comparative Examples 24 to 29, the rubber composition of Comparative Example 30 was used as the control for Example 43 and Comparative Examples 31 and 32, and the rubber composition of Comparative Example 33 was used as the control for Examples 44 and 45.

The rubber composition of Comparative Example 34 was used as the control for Examples 46 to 59 and Comparative Examples 35 to 37, the rubber composition of Comparative Example 38 was used as the control for Example 60 and Comparative Examples 39 and 40, and the rubber composition of Comparative Example 41 was used as the control for Examples 61 and 62.

The rubber composition of Comparative Example 42 was used as the control for Examples 63 to 73 and Comparative Examples 43 to 45, the rubber composition of Comparative Example 46 was used as the control for Example 74 and Comparative Examples 47 and 48, and the rubber composition of Comparative Example 49 was used as the control for Examples 75 and 76.

The rubber composition of Comparative Example 50 was used as the control for Examples 77 to 85 and Comparative Examples 51 to 54, the rubber composition of Comparative Example 55 was used as the control for Example 86 and Comparative Examples 56 and 57, and the rubber composition of Comparative Example 58 was used as the control for Examples 87 and 88.

(5) Formation of blisters

The formation of blisters was examined by using RHEO-GRAPH 2000 manufactured by GOTTFERT. A die having a thickness of 2 mm and an outlet of a rectangular shape of 9 mm×2 mm was used, and the examination was conducted at 120° C. A sample was extruded at a piston extrusion speed of 10 mm/sec after preheating for 3 minutes, and the formation of blisters on the extruded material was visually examined.

TABLE 5

| components of formulation | parts by weight |
| --- | --- |
| rubber component | 100 |
| silica | varied |
| carbon black | varied |
| aromatic oil | 20 |
| stearic acid | 2 |
| silane coupling agent | varied |
| dispersion improver | varied |
| zinc oxide | 3 |
| antioxidant[*1] | 1 |
| vulcanization accelerator[*2] | 1.5 |
| sulfur | 1.5 |

[*1]N-phenyl-N'-isopropyl-p-phenylenediamine
[*2]N-oxydiethylene-2-benzothiazolsulfenamide

TABLE 6-1

| Example | | | 1 | 2 | 3 | | |
| --- | --- | --- | --- | --- | --- | --- | --- |
| Comparative Example | 1 | 2 | | | | 3 | 4 |
| Formulation (parts by weight) | | | | | | | |
| BR01[*1] | — | — | — | — | — | — | — |
| SBR1500[*1] | 65 | 65 | 65 | 65 | 65 | 65 | 65 |
| NR | 35 | 35 | 35 | 35 | 35 | 35 | 35 |
| silica (NIPSIL AQ)[*2] | 60 | 60 | 60 | 60 | 60 | 60 | 60 |
| carbon black (SEAST 3H)[*3] | — | — | — | — | — | — | — |
| silane coupling agent | | | | | | | |
| type | B | A | B | B | B | B | B |
| amount | 6.0 | 6.0 | 6.0 | 6.0 | 6.0 | 6.0 | 6.0 |
| silicone oil modified with alkoxy group | | | | | | | |
| type | — | — | a | a | a | a | a |
| amount | — | — | 2 | 6 | 9 | 12 | 0.5 |
| measured temperature of mixed rubber (° C.) | 152 | 152 | 153 | 155 | 155 | 154 | 156 |
| Results of evaluation | | | | | | | |
| abrasion resistance (index) | 100 | 99 | 104 | 107 | 102 | 98 | 99 |
| Mooney viscosity (index) | 100 | 141 | 96 | 91 | 87 | 83 | 98 |
| heat buildup (index) | 100 | 98 | 97 | 92 | 89 | 86 | 100 |
| formation of blisters | none | none | none | none | none | none | none |
| rolling resistance (index) | 100 | 101 | 101 | 106 | 108 | 109 | 100 |

TABLE 6-2

| Example | 4 | 5 | 6 | 7 | 8 | |
| --- | --- | --- | --- | --- | --- | --- |
| Comparative Example | | | | | | 5 |
| Formulation (parts by weight) | | | | | | |
| BR01[*1] | — | — | — | — | — | — |
| SBR1500[*1] | 65 | 65 | 65 | 65 | 65 | 65 |
| NR | 35 | 35 | 35 | 35 | 35 | 35 |
| silica (NIPSIL AQ)[*2] | 60 | 60 | 60 | 60 | 80 | 90 |
| carbon black (SEAST 3H)[*3] | — | — | — | — | — | — |
| silane coupling agent | | | | | | |
| type | C | D | E | F | C | C |
| amount | 6.0 | 6.0 | 6.0 | 6.0 | 8.0 | 9.0 |

TABLE 6-2-continued

| Example | 4 | 5 | 6 | 7 | 8 | |
|---|---|---|---|---|---|---|
| Comparative Example | | | | | | 5 |
| silicone oil modified with alkoxy group | | | | | | |
| type | a | a | a | a | a | a |
| amount | 6 | 6 | 6 | 6 | 8 | 9 |
| measured temperature of mixed rubber (° C.) | 155 | 156 | 155 | 154 | 160 | 166 |
| Results of evaluation | | | | | | |
| abrasion resistance (index) | 104 | 100 | 106 | 102 | 114 | 122 |
| Mooney viscosity (index) | 79 | 72 | 86 | 74 | 91 | 102 |
| heat buildup (index) | 94 | 99 | 93 | 96 | 97 | 104 |
| formation of blisters | none | none | none | none | none | none |
| rolling resistance (index) | 103 | 102 | 104 | 102 | 101 | 96 |

TABLE 6-3

| Example | | | 9 | 10 | 11 | 12 |
|---|---|---|---|---|---|---|
| Comparative Example | 6 | 7 | | | | |
| Formulation (parts by weight) | | | | | | |
| BR01*1 | — | — | — | — | — | 20 |
| SBR1500*1 | 65 | 65 | 65 | 65 | 65 | 45 |
| NR | 35 | 35 | 35 | 35 | 35 | 35 |
| silica (NIPSIL AQ)*2 | 60 | 60 | 60 | 60 | 60 | 60 |
| carbon black (SEAST 3H)*3 | — | — | — | — | — | — |
| silane coupling agent | | | | | | |
| type | B | B | B | B | B | B |
| amount | 6.0 | 6.0 | 6.0 | 6.0 | 6.0 | 6.0 |
| silicone oil modified with alkoxy group | | | | | | |
| type | b | c | d | e | f | a |
| amount | 6 | 6 | 6 | 6 | 6 | 6 |
| measured temperature of mixed rubber (° C.) | 152 | 154 | 154 | 155 | 153 | 152 |
| Results of evaluation | | | | | | |
| abrasion resistance (index) | 97 | 93 | 102 | 103 | 103 | 117 |
| Mooney viscosity (index) | 99 | 92 | 97 | 88 | 95 | 84 |
| heat buildup (index) | 101 | 102 | 98 | 90 | 96 | 92 |
| formation of blisters | none | none | none | none | none | none |
| rolling resistance (index) | 100 | 98 | 102 | 107 | 102 | 105 |

*1 Products of JAPAN SYNTHETIC RUBBER Co., Ltd.
*2 A product of NIPPON SILICA INDUSTRIAL Co., Ltd.
*3 A product of TOKAI CARBON Co., Ltd.

TABLE 7

| Example | | | | 13 | | 14 | 15 |
|---|---|---|---|---|---|---|---|
| Comparative Example | 8 | 9 | 10 | | 11 | | |
| Formulation (parts by weight) | | | | | | | |
| BR01*1 | — | — | — | — | — | — | — |
| SBR1500*1 | — | — | — | — | — | — | — |
| NR | 100 | 100 | 100 | 100 | 100 | 100 | 100 |

TABLE 7-continued

| Example | | | | 13 | | 14 | 15 |
|---|---|---|---|---|---|---|---|
| Comparative Example | 8 | 9 | 10 | | 11 | | |
| silica (NIPSIL AQ)*2 | 10 | 10 | 20 | 20 | 30 | 30 | 20 |
| carbon black (SEAST 3H)*3 | 40 | 40 | 40 | 40 | 55 | 55 | 70 |
| silane coupling agent | | | | | | | |
| type | B | B | B | B | B | B | B |
| amount | 1.0 | 1.0 | 2.0 | 2.0 | 3.0 | 3.0 | 2.0 |
| silicone oil modified with alkoxy group | | | | | | | |
| type | — | a | — | a | — | a | a |
| amount | — | 1 | — | 2 | — | 3 | 2 |
| measured temperature of mixed rubber (° C.) | 152 | 153 | 152 | 151 | 154 | 155 | 155 |
| Results of evaluation | | | | | | | |
| abrasion resistance (index) | 100 | 98 | 115 | 117 | 100 | 102 | 125 |
| Mooney viscosity (index) | 100 | 100 | 105 | 98 | 100 | 92 | 95 |
| heat buildup (index) | 100 | 98 | 104 | 98 | 100 | 94 | 98 |
| formation of blisters | none | none | none | none | none | none | none |
| rolling resistance (index) | 100 | 102 | 96 | 102 | 100 | 104 | 102 |

*1 Products of JAPAN SYNTHETIC RUBBER Co., Ltd.
*2 A product of NIPPON SILICA INDUSTRIAL Co., Ltd.
*3 A product of TOKAI CARBON Co., Ltd.

TABLE 8-1

| Example | | | 16 | 17 | 18 | |
|---|---|---|---|---|---|---|
| Comparative Example | 12 | 13 | | | | 14 |
| Formulation (parts by weight) | | | | | | |
| BR01*1 | — | — | — | — | — | — |
| SBR1500*1 | 65 | 65 | 65 | 65 | 65 | 65 |
| NR | 35 | 35 | 35 | 35 | 35 | 35 |
| silica (NIPSIL AQ)*2 | 60 | 60 | 60 | 60 | 60 | 60 |
| carbon black (SEAST 3H)*3 | — | — | — | — | — | — |
| silane coupling agent | | | | | | |
| type | B | A | B | E | E | B |
| amount | 6.0 | 6.0 | 6.0 | 6.0 | 6.0 | 6.0 |
| silicone oil modified with amino group | | | | | | |
| type | — | — | g | g | g | g |
| amount | — | — | 2 | 6 | 9 | 12 |
| measured temperature of mixed rubber (°C.) | 152 | 152 | 151 | 152 | 153 | 154 |
| Results of evaluation | | | | | | |
| abrasion resistance (index) | 100 | 99 | 102 | 104 | 102 | 97 |
| Mooney viscosity (index) | 100 | 141 | 96 | 92 | 83 | 80 |
| heat buildup (index) | 100 | 98 | 96 | 93 | 90 | 88 |
| formation of blisters | none | none | none | none | none | none |
| rolling resistance (index) | 100 | 101 | 102 | 103 | 106 | 107 |

TABLE 8-2

| Example | | 19 | 20 | 21 | 22 | 23 |
|---|---|---|---|---|---|---|
| Comparative Example | 15 | | | | | |
| Formulation (parts by weight) | | | | | | |
| BR01[*1] | — | — | — | — | — | — |
| SBR1500[*1] | 65 | 65 | 65 | 65 | 65 | 65 |
| NR | 35 | 35 | 35 | 35 | 35 | 35 |
| silica (NIPSIL AQ)[*2] | 60 | 60 | 60 | 60 | 60 | 80 |
| carbon black (SEAST 3H)[*3] | — | — | — | — | — | — |
| silane coupling agent | | | | | | |
| type | B | C | D | E | F | C |
| amount | 6.0 | 6.0 | 6.0 | 6.0 | 6.0 | 8.0 |
| silicone oil modified with amino group | | | | | | |
| type | g | g | g | g | g | g |
| amount | 0.5 | 6 | 6 | 6 | 6 | 8 |
| measured temperature of mixed rubber (°C.) | 152 | 153 | 154 | 152 | 152 | 155 |
| Results of evaluation | | | | | | |
| abrasion resistance (index) | 99 | 104 | 101 | 104 | 102 | 116 |
| Mooney viscosity (index) | 98 | 82 | 75 | 88 | 78 | 93 |
| heat buildup (index) | 99 | 95 | 99 | 94 | 98 | 99 |
| formation of blisters | none | none | none | none | none | none |
| rolling resistance (index) | 100 | 103 | 101 | 103 | 102 | 101 |

TABLE 8-3

| Example | | | | 24 | 25 | 26 |
|---|---|---|---|---|---|---|
| Comparative Example | 16 | 17 | 18 | | | |
| Formulation (parts by weight) | | | | | | |
| BR01[*1] | — | — | — | — | — | — |
| SBR1500[*1] | 65 | 65 | 65 | 65 | 65 | 65 |
| NR | 35 | 35 | 35 | 35 | 35 | 35 |
| silica (NIPSIL AQ)[*2] | 90 | 60 | 60 | 60 | 60 | 60 |
| carbon black (SEAST 3H)[*3] | — | — | — | — | — | — |
| silane coupling agent | | | | | | |
| type | C | B | B | B | B | B |
| amount | 9.0 | 6.0 | 6.0 | 6.0 | 6.0 | 6.0 |
| silicone oil modified with amino group | | | | | | |
| type | g | h | i | j | k | m |
| amount | 9 | 6 | 6 | 6 | 6 | 6 |
| measured temperature of mixed rubber (°C.) | 152 | 151 | 153 | 154 | 155 | 152 |
| Results of evaluation | | | | | | |
| abrasion resistance (index) | 126 | 100 | 97 | 103 | 102 | 104 |
| Mooney viscosity (index) | 109 | 96 | 98 | 93 | 92 | 89 |
| heat buildup (index) | 107 | 102 | 98 | 97 | 92 | 92 |
| formation of blisters | none | none | none | none | none | none |
| rolling resistance (index) | 94 | 98 | 102 | 102 | 104 | 104 |

[*1]Products of JAPAN SYNTHETIC RUBBER Co., Ltd.
[*2]A product of NIPPON SILICA INDUSTRIAL Co., Ltd.
[*3]A product of TOKAI CARBON Co., Ltd.

TABLE 9-1

| Example | 27 | 28 | | | | 29 |
|---|---|---|---|---|---|---|
| Comparative Example | | | 19 | 20 | 21 | |
| Formulation (parts by weight) | | | | | | |
| BR01[*1] | — | 20 | — | — | — | — |
| SBR1500[*1] | 65 | 45 | — | — | — | — |
| NR | 35 | 35 | 100 | 100 | 100 | 100 |
| silica (NIPSIL AQ)[*2] | 60 | 60 | 10 | 10 | 20 | 20 |
| carbon black (SEAST 3H)[*3] | — | — | 40 | 40 | 40 | 40 |
| silane coupling agent | | | | | | |
| type | B | B | B | B | B | B |
| amount | 6.0 | 6.0 | 1.0 | 1.0 | 2.0 | 2.0 |
| silicone oil modified with amino group | | | | | | |
| type | n | g | — | g | — | g |
| amount | 6 | 6 | — | 1 | — | 2 |
| measured temperature of mixed rubber (°C.) | 154 | 151 | 151 | 150 | 152 | 152 |
| Results of evaluation | | | | | | |
| abrasion resistance (index) | 102 | 116 | 100 | 99 | 106 | 108 |
| Mooney viscosity (index) | 90 | 86 | 100 | 99 | 106 | 98 |
| heat buildup (index) | 90 | 94 | 100 | 100 | 104 | 97 |
| formation of blisters | none | none | none | none | none | none |
| rolling resistance (index) | 106 | 103 | 100 | 100 | 98 | 102 |

TABLE 9-2

| Example | | 30 | 31 |
|---|---|---|---|
| Comparative Example | 22 | | |
| Formulation (parts by weight) | | | |
| BR01[*1] | — | — | — |
| SBR1500[*1] | — | — | — |
| NR | 100 | 100 | 100 |
| silica (NIPSIL AQ)[*2] | 30 | 30 | 20 |
| carbon black (SEAST 3H)[*3] | 55 | 55 | 70 |
| silane coupling agent | | | |
| type | B | B | B |
| amount | 3.0 | 3.0 | 2.0 |
| silicone oil modified with amino group | | | |
| type | — | g | g |
| amount | — | 3 | 2 |
| measured temperature of mixed rubber (°C.) | 155 | 156 | 154 |
| Results of evaluation | | | |
| abrasion resistance (index) | 100 | 103 | 118 |
| Mooney viscosity (index) | 100 | 96 | 98 |
| heat buildup (index) | 100 | 94 | 99 |
| formation of blisters | none | none | none |
| rolling resistance (index) | 100 | 104 | 102 |

[*1]Products of JAPAN SYNTHETIC RUBBER Co., Ltd.
[*2]A product of NIPPON SILICA INDUSTRIAL Co., Ltd.
[*3]A product of TOKAI CARBON Co., Ltd.

TABLE 10-1

| Example | | | 32 | 33 | 34 | |
|---|---|---|---|---|---|---|
| Comparative Example | 23 | 24 | | | | 25 |
| Formulation (parts by weight) | | | | | | |
| BR01[*1] | — | — | — | — | — | — |
| SBR1500[*1] | 65 | 65 | 65 | 65 | 65 | 65 |
| NR | 35 | 35 | 35 | 35 | 35 | 35 |
| silica (NIPSIL AQ)[*2] | 60 | 60 | 60 | 60 | 60 | 60 |
| carbon black (SEAST 3H)[*3] | — | — | — | — | — | — |
| silane coupling agent | | | | | | |
| type | B | A | B | B | B | B |
| amount | 6.0 | 6.0 | 6.0 | 6.0 | 6.0 | 6.0 |
| silicone oil[*4] | | | | | | |
| type | — | — | s | s | s | s |
| amount | — | — | 2 | 6 | 9 | 12 |
| measured temperature of mixed rubber (°C.) | 152 | 152 | 152 | 153 | 151 | 155 |
| Results of evaluation | | | | | | |
| abrasion resistance (index) | 100 | 99 | 104 | 103 | 102 | 97 |
| Mooney viscosity (index) | 100 | 141 | 95 | 92 | 85 | 83 |
| heat buildup (index) | 100 | 98 | 96 | 94 | 90 | 88 |
| formation of blisters | none | none | none | none | none | none |
| rolling resistance (index) | 100 | 101 | 102 | 103 | 106 | 108 |

TABLE 10-2

| Example | | 35 | 36 | 37 | 38 | 39 |
|---|---|---|---|---|---|---|
| Comparative Example | 26 | | | | | |
| Formulation (parts by weight) | | | | | | |
| BR01[*1] | — | — | — | — | — | — |
| SBR1500[*1] | 65 | 65 | 65 | 65 | 65 | 65 |
| NR | 35 | 35 | 35 | 35 | 35 | 35 |
| silica (NIPSIL AQ)[*2] | 60 | 60 | 60 | 60 | 60 | 80 |
| carbon black (SEAST 3H)[*3] | — | — | — | — | — | — |
| silane coupling agent | | | | | | |
| type | B | C | D | E | F | C |
| amount | 6.0 | 6.0 | 6.0 | 6.0 | 6.0 | 8.0 |
| silicone oil[*4] | | | | | | |
| type | s | s | s | s | s | s |
| amount | 0.5 | 6 | 6 | 6 | 6 | 8 |
| measured temperature of mixed rubber (°C.) | 152 | i51 | 154 | 154 | 155 | 154 |
| Results of evaluation | | | | | | |
| abrasion resistance (index) | 100 | 103 | 100 | 103 | 102 | 110 |
| Mooney viscosity (index) | 99 | 81 | 76 | 87 | 79 | 93 |
| heat buildup (index) | 100 | 95 | 98 | 94 | 97 | 98 |
| formation of blisters | none | none | none | none | none | none |
| rolling resistance (index) | 100 | 102 | 101 | 104 | 102 | 102 |

TABLE 10-3

| Example | | 40 | 41 | | | 42 |
|---|---|---|---|---|---|---|
| Comparative Example | 27 | | | 28 | 29 | |
| Formulation (parts by weight) | | | | | | |
| BR01[*1] | — | — | — | — | — | 20 |
| SBR1500[*1] | 65 | 65 | 65 | 65 | 65 | 45 |
| NR | 35 | 35 | 35 | 35 | 35 | 35 |
| silica (NIPSIL AQ)[*2] | 90 | 60 | 60 | 60 | 60 | 60 |
| carbon black (SEAST 3H)[*3] | — | — | — | — | — | — |
| silane coupling agent | | | | | | |
| type | C | B | B | B | B | B |
| amount | 9.0 | 6.0 | 6.0 | 6.0 | 6.0 | 6.0 |
| silicone Oil[*4] | | | | | | |
| type | s | t | u | v | w | s |
| amount | 9 | 6 | 6 | 6 | 6 | 6 |
| measured temperature of mixed rubber (°C.) | 153 | 152 | 153 | 151 | 154 | 153 |
| Results of evaluation | | | | | | |
| abrasion resistance (index) | 119 | 105 | 106 | 99 | 94 | 114 |
| Mooney viscosity (index) | 104 | 94 | 96 | 98 | 95 | 85 |
| heat buildup (index) | 106 | 92 | 90 | 102 | 101 | 93 |
| formation of blisters | none | none | none | none | none | none |
| rolling resistance (index) | 94 | 104 | 107 | 99 | 99 | 105 |

[*1]Products of JAPAN SYNTHETIC RUBBER Co., Ltd.
[*2]A product of NIPFON SILICA INDUSTRIAL Co., Ltd.
[*3]A product of TOKAI CARBON Co., Ltd.
[*4]Hydrogen silicone oil

TABLE 11

| Example | | | | 43 | | 44 | 45 |
|---|---|---|---|---|---|---|---|
| Comparative Example | 30 | 31 | 32 | | 33 | | |
| Formulation (parts by weight) | | | | | | | |
| BR01[*1] | — | — | — | — | — | — | — |
| SBR1500[*1] | — | — | — | — | — | — | — |
| NR | 100 | 100 | 100 | 100 | 100 | 100 | 100 |
| silica (NIPSIL AQ)[*2] | 10 | 10 | 20 | 20 | 30 | 30 | 20 |
| carbon black (SEAST 3H)[*3] | 40 | 40 | 40 | 40 | 55 | 55 | 70 |
| silane coupling agent | | | | | | | |
| type | B | B | B | B | B | B | B |
| amount | 1.0 | 1.0 | 2.0 | 2.0 | 3.0 | 3.0 | 2.0 |
| silicone oil[*4] | | | | | | | |
| type | — | u | — | u | — | u | u |
| amount | — | 1 | — | 2 | — | 3 | 2 |
| measured temperature of mixed rubber (°C.) | 150 | 152 | 153 | 152 | 157 | 155 | 155 |
| Results of evaluation | | | | | | | |
| abrasion resistance (index) | 100 | 100 | 112 | 117 | 100 | 102 | 118 |
| Mooney viscosity (index) | 100 | 99 | 103 | 99 | 100 | 94 | 98 |
| heat buildup (index) | 100 | 100 | 103 | 97 | 100 | 95 | 98 |

TABLE 11-continued

| Example Comparative Example | 30 | 31 | 32 | 43 33 | 44 | 45 |
|---|---|---|---|---|---|---|
| formation of blisters | none | none | none | none none | none | none |
| rolling resistance (index) | 100 | 100 | 98 | 102 100 | 103 | 102 |

*1 Products of JAPAN SYNTHETIC RUBBER Co., Ltd.
*2 A product of NIPFON SILICA INDUSTRIAL Co., Ltd.
*3 A product of TOKAI CARBON Co., Ltd.
*4 Hydrogen silicone oil

TABLE 12-1

| Example Comparative Example | 34 | 35 | 46 | 47 | 48 | 36 |
|---|---|---|---|---|---|---|
| Formulation (parts by weight) | | | | | | |
| BR01*1 | — | — | — | — | — | — |
| SBR1500*1 | 65 | 65 | 65 | 65 | 65 | 65 |
| NR | 35 | 35 | 35 | 35 | 35 | 35 |
| silica (NIPSIL AQ)*2 | 60 | 60 | 60 | 60 | 60 | 60 |
| carbon black (SEAST 3H)*3 | — | — | — | — | — | — |
| silane coupling agent | | | | | | |
| type | B | A | B | B | B | B |
| amount | 6.0 | 6.0 | 6.0 | 6.0 | 6.0 | 6.0 |
| compound containing nitrogen | | | | | | |
| urea | — | — | 1 | 3 | 9 | 12 |
| 1,1-dimethylurea | — | — | — | — | — | — |
| 1,3-diphenylurea | — | — | — | — | — | — |
| acetamide | — | — | — | — | — | — |
| stearic acid hydrazide | — | — | — | — | — | — |
| measured temperature of mixed rubber (°C.) | 152 | 152 | 153 | 151 | 151 | 152 |
| Results of evaluation | | | | | | |
| abrasion resistance (index) | 100 | 99 | 102 | 105 | 109 | 110 |
| Mooney viscosity (index) | 100 | 141 | 94 | 83 | 85 | 111 |
| heat buildup (index) | 100 | 98 | 95 | 84 | 79 | 78 |
| formation of blisters | none | none | none | none | none | none |
| rolling resistance (index) | 100 | 102 | 103 | 108 | 110 | 110 |

TABLE 12-2

| Example Comparative Example | 49 | 50 | 51 | 52 | 53 | 54 |
|---|---|---|---|---|---|---|
| Formulation (parts by weight) | | | | | | |
| BR01*1 | — | — | — | — | — | — |
| SBR1500*1 | 65 | 65 | 65 | 65 | 65 | 65 |
| NR | 35 | 35 | 35 | 35 | 35 | 35 |
| silica (NIPSIL AQ)*2 | 60 | 60 | 60 | 60 | 60 | 60 |
| carbon black (SEAST 3H)*3 | — | — | — | — | — | — |
| silane coupling agent | | | | | | |
| type | B | B | B | B | C | D |
| amount | 6.0 | 6.0 | 6.0 | 6.0 | 6.0 | 6.0 |
| compound containing nitrogen | | | | | | |
| urea | — | — | — | — | 3 | 3 |
| 1,1-dimethylurea | 3 | — | — | — | — | — |
| 1,3-diphenylurea | — | 3 | — | — | — | — |
| acetamide | — | — | 3 | — | — | — |
| stearic acid hydrazide | — | — | — | 3 | — | — |
| measured temperature of mixed rubber (°C.) | 154 | 152 | 155 | 154 | 152 | 155 |
| Results of evaluation | | | | | | |
| abrasion resistance (index) | 104 | 103 | 105 | 102 | 103 | 100 |
| Mooney viscosity (index) | 84 | 89 | 87 | 83 | 73 | 68 |
| heat buildup (index) | 90 | 92 | 92 | 85 | 87 | 94 |
| formation of blisters | none | none | none | none | none | none |
| rolling resistance (index) | 105 | 104 | 104 | 107 | 107 | 102 |

TABLE 12-3

| Example Comparative Example | 55 | 56 | 57 | 37 | 58 | 59 |
|---|---|---|---|---|---|---|
| Formulation (parts by weight) | | | | | | |
| BR01*1 | — | — | — | — | — | 20 |
| SBR1500*1 | 65 | 65 | 65 | 65 | 65 | 45 |
| NR | 35 | 35 | 35 | 35 | 35 | 35 |
| silica (NIPSIL AQ)*2 | 60 | 60 | 80 | 90 | 60 | 60 |
| carbon black (SEAST 3H)*3 | — | — | — | — | — | — |
| silane coupling agent | | | | | | |
| type | E | F | C | C | B | B |
| amount | 6.0 | 6.0 | 8.0 | 9.0 | 6.0 | 6.0 |
| compound containing nitrogen | | | | | | |
| urea | 3 | 3 | 4 | 4.5 | 0.5 | 3 |
| 1,1-dimethylurea | — | — | — | — | — | — |
| 1,3-diphenylurea | — | — | — | — | — | — |
| acetamide | — | — | — | — | — | — |
| stearic acid hydrazide | — | — | — | — | — | — |
| measured temperature of mixed rubber (°C.) | 155 | 156 | 154 | 151 | 152 | 153 |
| Results of evaluation | | | | | | |
| abrasion resistance (index) | 104 | 102 | 114 | 128 | 99 | 115 |
| Mooney viscosity (index) | 80 | 70 | 91 | 101 | 100 | 87 |
| heat buildup (index) | 86 | 90 | 94 | 103 | 99 | 81 |
| formation of blisters | none | none | none | none | none | none |
| rolling resistance (index) | 106 | 105 | 102 | 97 | 102 | 108 |

*1 Products of JAPAN SYNTHETIC RUBBER Co., Ltd.
*2 A product of NIPPON SILICA INDUSTRIAL Co., Ltd.
*3 A product of TOKAI CARBON Co., Ltd.

TABLE 13

| Example Comparative Example | 38 | 39 | 40 | 60 41 | 61 | 62 |
|---|---|---|---|---|---|---|
| Formulation | | | | | | |
| BR01*1 | — | — | — | — | — | — |
| SBR1500*1 | — | — | — | — | — | — |
| NR | 100 | 100 | 100 | 100 | 100 | 100 |
| silica (NIPSIL AQ)*2 | 10 | 10 | 20 | 20 | 30 | 30 | 20 |
| carbon black | 40 | 40 | 40 | 40 | 55 | 55 | 70 |

TABLE 13-continued

| Example Comparative Example | 38 | 39 | 40 | 60 41 | 61 | 62 |
|---|---|---|---|---|---|---|---|
| (SEAST 3H)*3 silane coupling agent | | | | | | | |
| type | B | B | B | B | B | B | B |
| amount | 1.0 | 1.0 | 2.0 | 2.0 | 3.0 | 3.0 | 2.0 |
| compound containing nitrogen | | | | | | | |
| urea | — | 0.5 | — | 1 | — | 1.5 | 1 |
| 1,1-dimethylurea | — | — | — | — | — | — | — |
| i,3-diphenylurea | — | — | — | — | — | — | — |
| acetamide | — | — | — | — | — | — | — |
| stearic acid hydrazide | — | — | — | — | — | — | — |
| measured temperature of mixed rubber (°C.) | 154 | 151 | 153 | 150 | 154 | 155 | 153 |
| Results of evaluation | | | | | | | |
| abrasion resistance (index) | 100 | 101 | 114 | 118 | 100 | 107 | 114 |
| Mooney viscosity (index) | 100 | 100 | 106 | 94 | 100 | 92 | 97 |
| heat buildup (index) | 100 | 98 | 102 | 93 | 100 | 91 | 96 |
| formation of blisters | none | none | none | none | none | none | none |
| rolling resistance (index) | 100 | 102 | 97 | 103 | 100 | 104 | 102 |

*1 Products of JAPAN SYNTHETIC RUBBER Co., Ltd.
*2 A product of NIPPON SILICA INDUSTRIAL Co., Ltd.
*3 A product of TOKAI CARBON Co., Ltd.

TABLE 14-1

| Example Comparative Example | 42 | 43 | 63 | 64 | 65 |
|---|---|---|---|---|---|
| Formulation (parts by weight) | | | | | |
| BR01*1 | — | — | — | — | — |
| SBR1500*1 | 65 | 65 | 65 | 65 | 65 |
| NR | 35 | 35 | 35 | 35 | 35 |
| silica (NIPSIL AQ)*2 | 60 | 60 | 60 | 60 | 60 |
| carbon black (SEAST 3H)*3 | — | — | — | — | — |
| silane coupling agent | | | | | |
| type | B | A | B | B | B |
| amount | 6.0 | 6.0 | 6.0 | 6.0 | 6.0 |
| dimethylstearylamine | — | — | 1 | 3 | 9 |
| dimethyldecylamine | — | — | — | — | — |
| trioctylamine | — | — | — | — | — |
| measured temperature of mixed rubber (°C.) | 152 | 152 | 155 | 156 | 154 |
| Results of evaluation | | | | | |
| abrasion resistance (index) | 100 | 99 | 105 | 108 | 102 |
| Mooney viscosity (index) | 100 | 141 | 98 | 96 | 93 |
| heat buildup (index) | 100 | 98 | 96 | 92 | 85 |
| formation of blisters | none | none | none | none | none |
| rolling resistance (index) | 100 | 101 | 102 | 106 | 108 |

TABLE 14-2

| Example Comparative Example | 44 | 66 | 67 | 68 | 69 |
|---|---|---|---|---|---|
| Formulation (parts by weight) | | | | | |
| BR01*1 | — | — | — | — | — |
| SBR1500*1 | 65 | 65 | 65 | 65 | 65 |
| NR | 35 | 35 | 35 | 35 | 35 |
| silica (NIPSIL AQ)*2 | 60 | 60 | 60 | 60 | 80 |
| carbon black (SEAST 3H)*3 | — | — | — | — | — |
| silane coupling agent | | | | | |
| type | B | B | B | C | C |
| amount | 6.0 | 6.0 | 6.0 | 6.0 | 8.0 |
| dimethylstearylamine | 12 | — | — | 3 | 4 |
| dimethyldecylamine | — | 3 | — | — | — |
| trioctylamine | — | — | 3 | — | — |
| measured temperature of mixed rubber (°C.) | 154 | 152 | 154 | 155 | 158 |
| Results of evaluation | | | | | |
| abrasion resistance (index) | 97 | 106 | 105 | 108 | 116 |
| Mooney viscosity (index) | 90 | 94 | 98 | 89 | 97 |
| heat buildup (index) | 81 | 83 | 94 | 94 | 99 |
| formation of blisters | none | none | none | none | none |
| rolling resistance (index) | 109 | 108 | 104 | 105 | 101 |

TABLE 14-3

| Example Comparative Example | 45 | 70 | 71 | 72 | 73 |
|---|---|---|---|---|---|
| Formulation (parts by weight) | | | | | |
| BR01*1 | — | — | — | — | 20 |
| SBR1500*1 | 65 | 65 | 65 | 65 | 45 |
| NR | 35 | 35 | 35 | 35 | 35 |
| silica (NIPSIL AQ)*2 | 90 | 60 | 60 | 60 | 60 |
| carbon black (SEAST 3H)*3 | — | — | — | — | — |
| silane coupling agent | | | | | |
| type | C | D | E | F | B |
| amount | 9.0 | 6.0 | 6.0 | 6.0 | 6.0 |
| dimethylstearylamine | 4.5 | 3 | 3 | 3 | 3 |
| dimethyldecylamine | — | — | — | — | — |
| trioctylamine | — | — | — | — | — |
| measured temperature of mixed rubber (°C.) | 161 | 157 | 156 | 157 | 153 |
| Results of evaluation | | | | | |
| abrasion resistance (index) | 124 | 101 | 108 | 103 | 121 |
| Mooney viscosity (index) | 106 | 85 | 94 | 87 | 87 |
| heat buildup (index) | 103 | 96 | 93 | 95 | 92 |
| formation of blisters | none | none | none | none | none |
| rolling resistance (index) | 96 | 103 | 104 | 103 | 105 |

*1 Products of JAPAN SYNTHETIC RUBBER Co., Ltd.
*2 A product of NIPPON SILICA INDUSTRIAL Co., Ltd.
*3 A product of TOKAI CARBON Co., Ltd.

TABLE 15

| Example | | | | 74 | | 75 | 76 |
|---|---|---|---|---|---|---|---|
| Comparative Example | 46 | 47 | 48 | | 49 | | |
| Formulation (parts by weight) | | | | | | | |
| BR01*1 | — | — | — | — | — | — | — |
| SBR1500*1 | — | — | — | — | — | — | — |
| NR | 100 | 100 | 100 | 100 | 100 | 100 | 100 |
| silica (NIPSIL AQ)*2 | 10 | 10 | 20 | 20 | 30 | 30 | 20 |
| carbon black (SEAST 3H)*3 | 40 | 40 | 40 | 40 | 55 | 55 | 70 |
| silane coupling agent | | | | | | | |
| type | B | B | B | B | B | B | B |
| amount | 1.0 | 1.0 | 2.0 | 2.0 | 3.0 | 3.0 | 2.0 |
| dimethylstearylamine | — | 0.5 | — | 1 | 1.5 | 1 | 1 |
| dimethyldecylamine | — | — | — | — | — | — | — |
| trioctylamine | — | — | — | — | — | — | — |
| measured temperature of mixed rubber (°C.) | 153 | 155 | 152 | 152 | 155 | 152 | 157 |
| Results of evaluation | | | | | | | |
| abrasion resistance (index) | 100 | 99 | 113 | 117 | 100 | 105 | 122 |
| Mooney viscosity (index) | 100 | 100 | 104 | 96 | 100 | 95 | 98 |
| heat buildup (index) | 100 | 99 | 103 | 95 | 100 | 94 | 98 |
| formation of blisters | none | none | none | none | none | none | none |
| rolling resistance (index) | 100 | 101 | 97 | 104 | 100 | 104 | 102 |

*1Products of JAPAN SYNTHETIC RUBBER Co., Ltd.
*2A product of NIPPON SILICA INDUSTRIAL Co., Ltd.
*3A product of TOKAI CARBON Co., Ltd.

TABLE 16-1

| Example | | | 77 | 78 | 79 | | |
|---|---|---|---|---|---|---|---|
| Comparative Example | 50 | 51 | | | | 52 | 53 |
| Formulation (parts by weight) | | | | | | | |
| BR01*1 | — | — | — | — | — | — | — |
| SBR1500*1 | 65 | 65 | 65 | 65 | 65 | 65 | 65 |
| NR | 35 | 35 | 35 | 35 | 35 | 35 | 35 |
| silica (NIPSIL AQ)*2 | 60 | 60 | 60 | 60 | 60 | 60 | 60 |
| carbon black (SEAST 3H)*3 | — | — | — | — | — | — | — |
| silane coupling agent | | | | | | | |
| type | B | A | B | B | B | B | B |
| amount | 6.0 | 6.0 | 6.0 | 6.0 | 6.0 | 6.0 | 6.0 |
| hexamethyldisilazane | — | — | 2 | 6 | 9 | 1 | 12 |
| measured temperature of mixed rubber (°C.) | 152 | 152 | 154 | 153 | 152 | 155 | 152 |
| Results of evaluation | | | | | | | |
| abrasion resistance (index) | 100 | 99 | 102 | 105 | 102 | 100 | 94 |
| Mooney viscosity (index) | 100 | 141 | 98 | 95 | 91 | 100 | 89 |
| heat buildup (index) | 100 | 98 | 94 | 91 | 87 | 97 | 85 |
| formation of blisters | none | none | none | none | none | none | none |
| rolling resistance (index) | 100 | 101 | 103 | 104 | 107 | 102 | 108 |

TABLE 16-2

| Example | 80 | 81 | 82 | 83 | 84 | | 85 |
|---|---|---|---|---|---|---|---|
| Comparative Example | | | | | | 54 | |
| Formulation (parts by weight) | | | | | | | |
| BR01*1 | — | — | — | — | — | — | 20 |
| SBR1500*1 | 65 | 65 | 65 | 65 | 65 | 65 | 45 |
| NR | 35 | 35 | 35 | 35 | 35 | 35 | 35 |
| silica (NIPSIL AQ)*2 | 60 | 60 | 60 | 60 | 80 | 90 | 60 |
| carbon black (SEAST 3H)*3 | — | — | — | — | — | — | — |
| silane coupling agent | | | | | | | |
| type | C | D | E | F | C | C | B |
| amount | 6.0 | 6.0 | 6.0 | 6.0 | 8.0 | 9.0 | 6.0 |
| hexamethyldisilazane | 6 | 6 | 6 | 6 | 8 | 9 | 6 |
| measured temperature of mixed rubber (°C.) | 153 | 152 | 154 | 155 | 151 | 152 | 152 |
| Results of evaluation | | | | | | | |
| abrasion resistance (index) | 103 | 100 | 104 | 102 | 117 | 124 | 120 |
| Mooney viscosity (index) | 81 | 74 | 89 | 78 | 94 | 104 | 88 |
| heat buildup (index) | 93 | 98 | 92 | 96 | 96 | 102 | 87 |
| formation of blisters | none | none | none | none | none | none | none |
| rolling resistance (index) | 104 | 102 | 104 | 102 | 103 | 98 | 106 |

*1Products of JAPAN SYNTHETIC RUBBER Co., Ltd.
*2A product of NIPPON SILICA INDUSTRIAL Co., Ltd.
*3A product of TOKAI CARBON Co., Ltd.

TABLE 17

| Example | | | | 86 | | 87 | 88 |
|---|---|---|---|---|---|---|---|
| Comparative Example | 55 | 56 | 57 | | 58 | | |
| Formulation (parts by weight) | | | | | | | |
| BR01*1 | — | — | — | — | — | — | — |
| SBR1500*1 | — | — | — | — | — | — | — |
| NR | 100 | 100 | 100 | 100 | 100 | 100 | 100 |
| silica (NIPSIL AQ)*2 | 10 | 10 | 20 | 20 | 30 | 30 | 20 |
| carbon black (SEAST 3H)*3 | 40 | 40 | 40 | 40 | 55 | 55 | 70 |
| silane coupling agent | | | | | | | |
| type | B | B | B | B | B | B | B |
| amount | 1.0 | 1.0 | 2.0 | 2.0 | 3.0 | 3.0 | 2.0 |
| hexamethyldisilazane | — | 1 | — | 2 | — | 3 | 2 |
| measured temperature of mixed rubber (°C.) | 153 | 152 | 151 | 152 | 154 | 156 | 157 |
| Results of evaluation | | | | | | | |
| abrasion resistance (index) | 100 | 100 | 112 | 117 | 100 | 104 | 118 |
| Mooney viscosity (index) | 100 | 99 | 105 | 97 | 100 | 91 | 97 |
| heat buildup (index) | 100 | 100 | 105 | 97 | 100 | 90 | 97 |
| formation of blisters | none | none | none | none | none | none | none |
| rolling resistance (index) | 100 | 100 | 97 | 102 | 100 | 105 | 102 |

*1Products of JAPAN SYNTHETIC RUBBER Co., Ltd.
*2A product of NIPPON SILICA INDUSTRIAL Co., Ltd.
*3A product of TOKAI CARBON Co., Ltd.

INDUSTRIAL APPLICABILITY

Because the rubber composition of the present invention uses a silane coupling agent having a specific distribution of sulfur and a silica dispersion improver, formation of blisters during extrusion and gelation of a polymer due to the silane coupling agent are simultaneously suppressed during mixing at high temperatures of 150° C. or higher. The reaction of the silica and the silane coupling agent can efficiently be conducted without a decrease in workability, and dispersion of the silica into the rubber is improved. Therefore, the rubber composition is widely used for various types of pneumatic tires having excellent abrasion resistance and low heat buildup property.

We claim:

1. A rubber composition which comprises a rubber component comprising at least one member selected from the group consisting of natural rubber and diene synthetic rubbers; silica in an amount of 10 to 85 parts by weight per 100 parts by weight of the rubber component; in an amount of 1 to 20% by weight of the amount of silica, a silane coupling agent represented by following general formula (I):

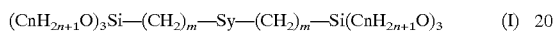

wherein n represents an integer of 1 to 3, m represents an integer of 1 to 9, y represents a positive number of 1 or more which has a distribution, and the distribution of —Sy— satisfies the relation:

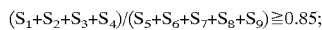

and, in an amount of 1 to 15% by weight of the amount of silica, at least one silica dispersion improver selected from the group consisting of:

(1) hexamethyldisilazane, (2) hydrogen oils silicone oils represented by general formula (II):

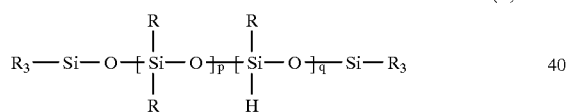

(3) silicone oils modified with an alkoxy group or an amino group which are represented by general formula (III):

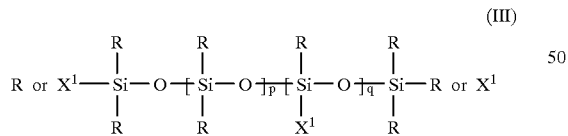

wherein, in general formulae (II) and (III), R represents an alkyl group having 1 to 3 carbon atoms or a phenyl group each of p and q represents a number of units, $1 \leq p+q \leq 200$, $q/(p+q) \geq 0.15$, $X^1$ represents an alkoxy group having 1 to 3 carbon atoms or an amino group represented by —$R^1NR^2R^3$ or —$R^1NHR^4NR^2R^3$, wherein $R^1$ and $R^4$ each represents —$(CH_2)_n$—, n represents 1, 2, or 3, and $R^2$ and $R^3$ each independently represents a hydrogen atom, an alkyl group having 1 to 36 carbon atoms, or a phenyl group, (4) carbonyl compounds containing nitrogen which are represented by general formulae (IV):

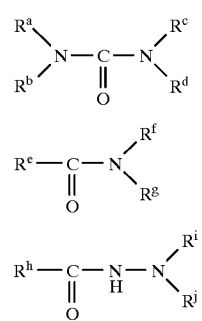

wherein $R^a$ to $R^j$ each represents a hydrogen atom or a linear or branched saturated or unsaturated aliphatic, aromatic, or alicyclic hydrocarbon having 1 to 20 carbon atoms, and (5) amine compounds represented by general formula (V):

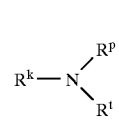

wherein $R^p$ and $R^t$ each independently represents an alkyl or alkenyl group having 1 to 36 carbon atoms, a benzyl group, a cyclohexyl group, or one of these groups substituted with a hydroxyl group, and $R^k$ represents an alkyl, alkenyl, or alkoxy group having 1 to 36 carbon atoms or one of these groups substituted with a hydroxyl group, a benzyl group, a benzyl group substituted with an alkyl or alkenyl group having 4 to 36 carbon atoms, or a group represented by following general formulae (VI):

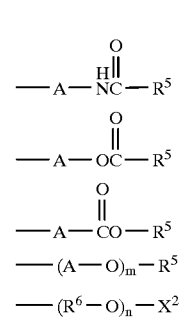

wherein $R^5$ represents an alkyl or alkenyl group having 1 to 36 carbon atoms, R6 represents an ethylene group or a propylene group, $X^2$ represents a hydrogen atom, an alkyl, alkenyl, alkyloyl, or alkenyloyl group having 1 to 18 carbon atoms, A represents an alkylene or hydroxyalkylene group having 2 to 6 carbon atoms, m represents an integer of 1 to 10, A may be the same or may differ from each other when m represents 2 or a number greater than 2, and n represents an integer of 1 to 10.

2. A rubber composition according to claim 1, wherein the amount of silica is 20 to 65 parts by weight per 100 parts by weight of the rubber component.

3. A rubber composition according to claim 1, wherein the amount of the silane coupling agent is 3 to 15% by weight of the amount of silica.

4. A rubber composition according to claim 1, wherein the amount of the silica dispersion improver is 2 to 15% by weight of the amount of silica.

5. A rubber composition according to claim 1, wherein the distribution of —Sy— satisfies the relation:

$(S_1+S_2+S_3)/$(component(s) S having 4 or more sulfurs)$\geq 0.45$ and the content of component $S_3$ is 20% or more.

6. A rubber composition according to claim 1, wherein the distribution of —Sy— satisfies the relation:

$(S_1+S_2+S_3)/$(component(s) S having 4 or more sulfurs)$\geq 0.55$ and the content of component $S_3$ is 30% or more.

7. A rubber composition according to claim 1, further comprising 80 parts by weight or less of carbon black as a reinforcing filler per 100 parts by weight of the rubber component.

8. A rubber composition according to claim 5, further comprising 80 parts by weight or less of carbon black as a reinforcing filler per 100 parts by weight of the rubber component.

9. A rubber composition according to claim 6, further comprising 80 parts by weight or less of carbon black as a reinforcing filler per 100 parts by weight of the rubber component.

10. A rubber composition according to claim 7, further comprising 20 to 60 parts by weight of carbon black as a reinforcing filler per 100 parts by weight of the rubber component.

11. A rubber composition according to claim 1, wherein anhydrous sodium sulfide (Na$_2$S) and sulfur (S) are reacted with each other in a mol ratio in a range of 1:1 to 1:2.5 in an atmosphere of an inert gas in a polar solvent to obtain sodium polysulfide, the obtained sodium polysulfide is reacted in an atmosphere of an inert gas with a halogenoalkoxysilane represented by general formula (VII):

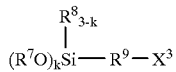
(VII)

wherein $R^7$ and R8 each represents an alkyl group having 1 to 3 carbon atoms, $R^9$ represents a divalent hydrocarbon group having 1 to 9 carbon atoms, $X^3$ represents a halogen atom, and k represents an integer of 1 to 3, and the obtained compound is used as the silane coupling agent.

12. A rubber composition according to claim 5, wherein anhydrous sodium sulfide (Na$_2$S) and sulfur (S) are reacted with each other in a mol ratio in a range of 1:1 to 1:2.5 in an atmosphere of an inert gas in a polar solvent to obtain sodium polysulfide, the obtained sodium polysulfide is reacted in an atmosphere of an inert gas with a halogenoalkoxysilane represented by general formula (VII) of claim 11, and the obtained compound is used as the silane coupling agent.

13. A rubber composition according to claim 6, wherein anhydrous sodium sulfide (Na$_2$S) and sulfur (S) are reacted with each other in a mol ratio in a range of 1:1 to 1:2.5 in an atmosphere of an inert gas in a polar solvent to obtain sodium polysulfide, the obtained sodium polysulfide is reacted in an atmosphere of an inert gas with a halogenoalkoxysilane represented by general formula (VII) of claim 11, and the obtained compound is used as the silane coupling agent.

14. A pneumatic tire which is manufactured by using the rubber composition described in claim 1 for tread rubber.

15. A pneumatic tire which is manufactured by using the rubber composition described in claim 5 for tread rubber.

16. A pneumatic tire which is manufactured by using the rubber composition described in claim 6 for tread rubber.

17. A pneumatic tire which is manufactured by using the rubber composition described in claim 7 for tread rubber.

18. A pneumatic tire which is manufactured by using the rubber composition described in claim 11 for tread rubber.

* * * * *